United States Patent
Bohm et al.

(10) Patent No.: US 6,834,385 B2
(45) Date of Patent: Dec. 21, 2004

(54) SYSTEM AND METHOD FOR UTILIZING DISPATCH QUEUES IN A MULTIPROCESSOR DATA PROCESSING SYSTEM

(75) Inventors: David Edward Bohm, Tucson, AZ (US); Robert Gerard LaBrie, Tucson, AZ (US); Daniel Eqidio Reyes, Tuscon, AZ (US)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 09/754,703

(22) Filed: Jan. 4, 2001

(65) Prior Publication Data

US 2002/0087618 A1 Jul. 4, 2002

(51) Int. Cl.[7] ................................................. G06F 9/46
(52) U.S. Cl. ....................................... 718/102; 712/203
(58) Field of Search ................................ 718/100–108; 709/201; 711/206; 712/28–31, 203, 219

(56) References Cited

U.S. PATENT DOCUMENTS

| | | | |
|---|---|---|---|
| 4,394,727 A | | 7/1983 | Hoffman et al. |
| 4,943,913 A | * | 7/1990 | Clark .......................... 711/206 |
| 5,319,782 A | * | 6/1994 | Goldberg et al. ........... 718/104 |
| 5,333,319 A | | 7/1994 | Silen |
| 5,826,081 A | | 10/1998 | Zolnowsky |
| 5,848,257 A | * | 12/1998 | Angle et al. ................. 712/219 |
| 5,872,972 A | * | 2/1999 | Boland et al. ............... 718/102 |
| 6,779,182 B1 | * | 8/2004 | Zolnowsky ................. 718/103 |

OTHER PUBLICATIONS

"Creating a Process," robelle found at http://daffy.robelle,com/smugbook/process.html.

* cited by examiner

*Primary Examiner*—St. John Courtenay, III
(74) *Attorney, Agent, or Firm*—Dale M. Crockatt; Dillon & Yudell LLP

(57) ABSTRACT

A method for utilizing dispatch queues operates in a data processing system that has multiple processors, an operating system, and an application with multiple threads. According to that method, a dedicated dispatch queue and a general dispatch queue are created at an application level, with the dedicated dispatch queue being dedicated to a task control block (TCB) of the data processing system. In response to determining that the TCB is available and the dedicated dispatch queue is not empty, a thread is dispatched from the dedicated dispatch queue to the available TCB for execution. In response to determining that the TCB is available and the dedicated dispatch queue is empty, a thread is dispatched from the general dispatch queue to the available TCB for execution. In an illustrative embodiment, bound threads are distinguished from unbound threads, the bound threads are scheduled only on the dedicated dispatch queue, and the unbound threads are scheduled only on the general dispatch queue.

18 Claims, 6 Drawing Sheets

SYSTEM AND METHOD FOR UTILIZING DISPATCH QUEUES IN A MULTIPROCESSOR DATA PROCESSING SYSTEM

BACKGROUND OF THE INVENTION

1. Field of the Invention

The present invention relates in general to computer systems and in particular to multiprocessor data processing systems. More specifically, the present invention relates to a system and method for utilizing dispatch queues in a multiprocessing system.

2. Description of Related Art

Conventional multiprocessor data processing systems typically utilize multiprocessing to simultaneously execute multiple programs or multiple parts of the same program. Multiprocessing is a mode of operation in which two or more of a computer's central processing units (CPUs) execute threads in tandem (see Microsoft Press Computer Dictionary, Third Edition, p. 320). A thread is a set of instructions (such as a part of a program) that can execute as an independent unit.

To coordinate the concurrent execution of multiple threads, the operating system in a typical multiprocessing system includes a queue for each of the system's processors, as well as a scheduler and a dispatcher. The scheduler utilizes the queues to schedule the threads for execution, and the dispatcher dispatches threads from the queues for execution on corresponding processors as those processors become available. A queue that is used in this manner by a dispatcher is known as a dispatch queue. To support different priority levels for different threads, the scheduler may place a high priority thread ahead of other threads in a queue, with the dispatcher looking to the head of that queue for a thread to be dispatched when the corresponding processor becomes available. As mentioned, these components are implemented at the operating system (OS) level.

Within the scheduling system of an OS, certain data constructs are used to represent threads and to store state data relating to those threads. For example, when the OS swaps a thread out of execution (i.e., suspends the thread), the operating system must retain state data (also known as context data) for that thread so that the thread may resume processing from the point of interruption when the thread is swapped back in. The OS distributed by International Business Machines Corporation (IBM) under the name Multiple Virtual Storage (MVS), for example, utilizes task control blocks (TCBs) to schedule and dispatch threads. Further, although other vendors may utilize different names for similar constructs, for purposes of this document, the term TCB refers to any data construct that is utilized by scheduling facilities of an OS to represent threads and store state data for those threads in a multiprocessor system.

While OS-level thread-scheduling facilities provide basic support for multiprocessing, further thread management capabilities can be provided at the application level by establishing queue facilities (e.g., a scheduler, a dispatcher, and another set of thread queues) at the application level. For example, application-level queue facilities can be utilized to assign different priorities to different threads at the application level.

However, a limitation of typical conventional application-level queue facilities is that each thread is bound to a particular TCB (i.e., affinity between threads and TCBs is enforced). Affinity between threads and TCBs (i.e., TCB affinity) is enforced because there are certain functions and system calls that require TCB affinity. For example, if a thread performs an input/output (I/O) function, that function may not complete successfully if the thread does not always execute on the same TCB.

An example of an application that utilizes application-level queue facilities in an environment that also includes OS-level queue facilities is the storage management system known as the TIVOLI® Storage Manager (TSM). In particular, TSM utilizes the queue facilities of a middleware component known as the Service Virtual Machine (SVM). In order to comply with the TCB affinity requirements described above, SVM provides multiple dispatch queues, with each dispatch queue bound to a corresponding TCB. Accordingly, each scheduled thread is also bound to a TCB.

At the OS level, when a thread has no more work to perform, the OS suspends that thread and activates a different thread, selecting the new thread from the OS-level dispatch queue. This process of suspending an exhausted thread and dispatching a new thread consumes a large amount of processing resources. For example, in a typical OS, hundreds of instructions must be executed to swap in a new thread for an old thread. Moreover, such swapping operations are typically serialized (through use of facilities such as local locks) to ensure that the multiple processors do not simultaneously execute conflicting swap instructions. By contrast, only twenty or so instructions might be required to dispatch a new thread at the application level. In general, the number of instructions required to dispatch a thread at the OS level is typically at least one order of magnitude greater than the number required at the application level.

One of the advantages of using application-level queue facilities is the ability to dispatch a series of application-level threads to a single OS-level thread without swapping in a new OS level thread each time one of those application-level threads is dispatched. However, when application-level thread scheduling facilities are utilized to dynamically supply content for an OS-level thread, that OS-level thread begins to depart from the definition of a thread (i.e., a set of instructions that can execute as a single unit), in that an OS-level thread might not be linked to any predetermined set of instructions. Therefore, hereinafter the term TCB is utilized to refer to an OS-level thread that is dynamically supplied with sets of instructions by an application, and the term thread is utilized to refer to an actual set of instructions that is treated as an executable unit at the application level. Accordingly, utilizing this terminology, when a thread on a TCB completes, the application can dispatch a new thread to that TCB, thereby avoiding the overhead associated with swapping in a new TCB.

However, as mentioned above, in conventional systems, all threads are bound to TCBs. Consequently, an application can avoid the overhead of swapping TCBs only for so long as the application has additional waiting threads that are bound to that particular TCB. If a TCB finishes executing a thread and no more threads are scheduled on the dispatch queue for that TCB, the application must relinquish the TCB to the OS. Even if there are waiting threads in queues for other TCBs, the restriction of TCB affinity prevents the application from dispatching threads from those queues to the free TCB.

In SVM, for example, when a thread on a TCB completes execution and no more threads are scheduled on the dispatch queue for that TCB, the dispatcher in SVM relinquishes control of that TCB to the OS by issuing a WAIT command.

The WAIT command activates the dispatcher at the OS level, causing the OS to suspend that TCB and dispatch a new TCB from a dispatch queue at the OS level. The new TCB or TCBs that the OS dispatches may be totally unrelated to the application which issued the WAIT command. Then, when a new thread gets scheduled on the dispatch queue for the suspended TCB, SVM will attempt to reactivate the TCB by issuing a POST command to the OS. However, depending on a number of factors (including the priority of other TCBs in the OS queue facilities), it may be some time before the OS responds to the POST by reactivating the required TCB and returning control of that TCB to the application.

In consideration of the time lost waiting for a response to a POST command, the present invention recognizes that, by minimizing the number of times that an application relinquishes control of TCBs, it is possible to enhance the performance of an application. Further, inconsideration of the processing overhead required to swap TCBs, the present invention recognizes that minimizing the number of times that an application relinquishes control of TCBs can also increase a system's overall processing efficiency.

SUMMARY OF THE INVENTION

The present invention relates to a method for utilizing dispatch queues in a data processing system with multiple processors, an operating system, and an application with multiple threads. According to that method, a dedicated dispatch queue and a general dispatch queue are created at an application level, with the dedicated dispatch queue being dedicated to a task control block (TCB) of the data processing system. In response to determining that the TCB is available and the dedicated dispatch queue is not empty, a thread is dispatched from the dedicated dispatch queue to the available TCB for execution. In response to determining that the TCB is available and the dedicated dispatch queue is empty, a thread is dispatched from the general dispatch queue to the available TCB for execution.

In an illustrative embodiment, bound threads are distinguished from unbound threads, the bound threads are scheduled only on the dedicated dispatch queue, and the unbound threads are scheduled only on the general dispatch queue.

All objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
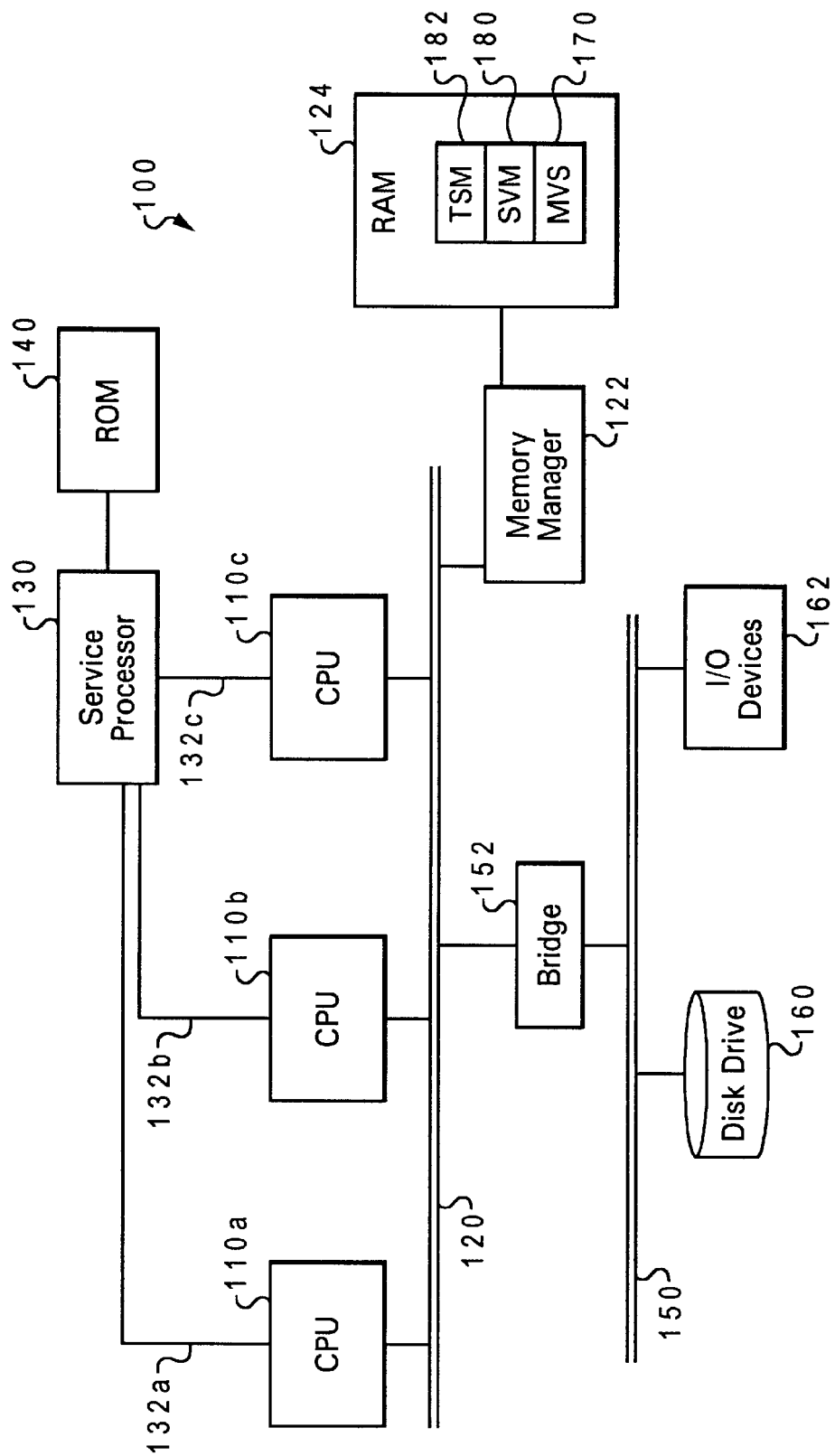
FIG. 1 is a block diagram of an exemplary multiprocessor system with thread-processing facilities in accordance with the present invention.

With reference now to the figures, and in particular with reference to FIG. 1, there is depicted an illustrative multiprocessor data processing system 100 with facilities in accordance with the present invention for utilizing dispatch queues. In the illustrative embodiment, data processing system 100 includes three CPUs 110a, 110b, and 110c that are connected, via a system bus 120 and a memory manager 122, to random access memory (RAM) 124. However, in alternative embodiments a larger or smaller number of CPUs could be used. Also included in data processing system 100 are one or more local buses 150 which communicate with system bus 120 via one or more intermediate bus bridges 152. One or more permanent data storage devices, such as a disk drive 160, are attached to local bus 150, as are I/O devices 162, such as a keyboard, a mouse, a display device, a communication port, and/or other I/O equipment (not illustrated).

Data processing system 100 also includes a service processor 130 that is connected to CPUs 110a, 110b, and 110c via configuration buses 132a, 132b, and 132bc. In the illustrative embodiment, those buses are Joint Test Access Group (JTAG) interfaces complying with the Institute of Electrical and Electronics Engineers, Inc. (IEEE) standard 1149.1.

When data processing system 100 is powered up, service processor 130 automatically prepares the system for operation by executing startup instructions from a read-only memory (ROM) 140 of data processing system 100. In particular, the startup instructions cause service processor 130 to perform initial system testing and configuration functions, to load a basic I/O system (BIOS), and then to initiate loading of an OS 170 into RAM 124, for example from disk drive 160. Preferably, after OS 170 is loaded, one or more default applications are also loaded into RAM 124. In the illustrative embodiment, OS 170 is the Multiple Virtual Storage (MVS) OS, and two default applications are loaded: a Service Virtual Machine (SVM) application 180 and a TIVOLI® Storage Manager (TSM) application 182. In the interest of brevity, MVS OS 170, SVM application 180, and TSM application 182 are respectively referred to hereinafter as simply MVS 170, SVM 180, and TSM 182.

TSM 182 provides storage management functionality, and SVM 180 provides a set of tools that help TSM 182 interact with MVS 170. Accordingly, SVM 180 is considered middleware. However, both TSM 182 and SVM 180 generally operate at a higher level of abstraction than does MVS 170. For purposes of this document, operations are considered to be performed at the application level if they are performed by TSM 182, SVM 180, or any other application situated similarly, relative to an underlying OS. By contrast, operations are considered to be performed at the OS level if those operations are performed by the OS.

Figure 2:
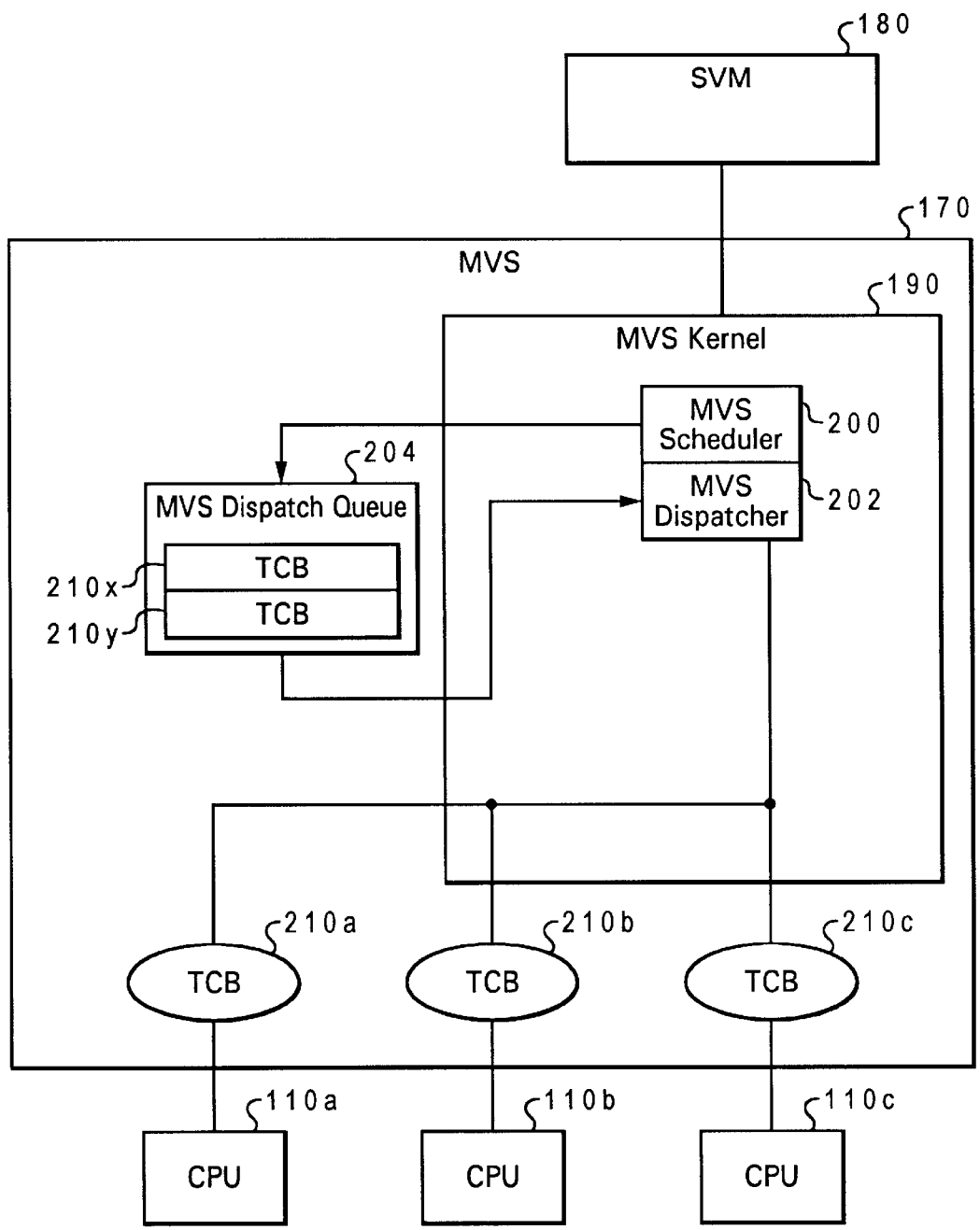
FIG. 2 is a block diagram illustrating exemplary logical components of the present invention within the data processing system of FIG. 1, focusing on the OS level.

Referring now to FIG. 2, there is depicted a block diagram illustrating exemplary logical components of the present invention within data processing system 100, focusing on the OS level. As shown in FIG. 2, SVM 180 communicates with MVS 170 primarily by means of the MVS kernel 190. In the illustrative embodiment, MVS 170 provides conventional OS-level scheduling facilities, while SVM includes application-level scheduling facilities that have been enhanced in accordance with the present invention.

In particular, MVS 170 includes an MVS dispatch queue 204, and MVS kernel 190 includes an MVS scheduler 200 and an MVS dispatcher 202, which respectively add TCBs to MVS dispatch queue 204 and dispatch TCBs from MVS dispatch queue 204. Specifically, MVS scheduler 200 adds a TCB to MVS dispatch queue 204 after that TCB has become ready to run, and MVS dispatcher 202 pulls a TCB from MVS dispatch queue 204 and starts that TCB running on a CPU as CPUs become available. In FIG. 2, MVS dispatch queue 204 is shown as containing two TCBs (i.e., TCBs 210x and 210y), while three other TCBs (i.e., TCBs 210a, 210b, and 210c) are actively executing on CPUs 110a, 110b, and 110c, respectively.

Figure 3:
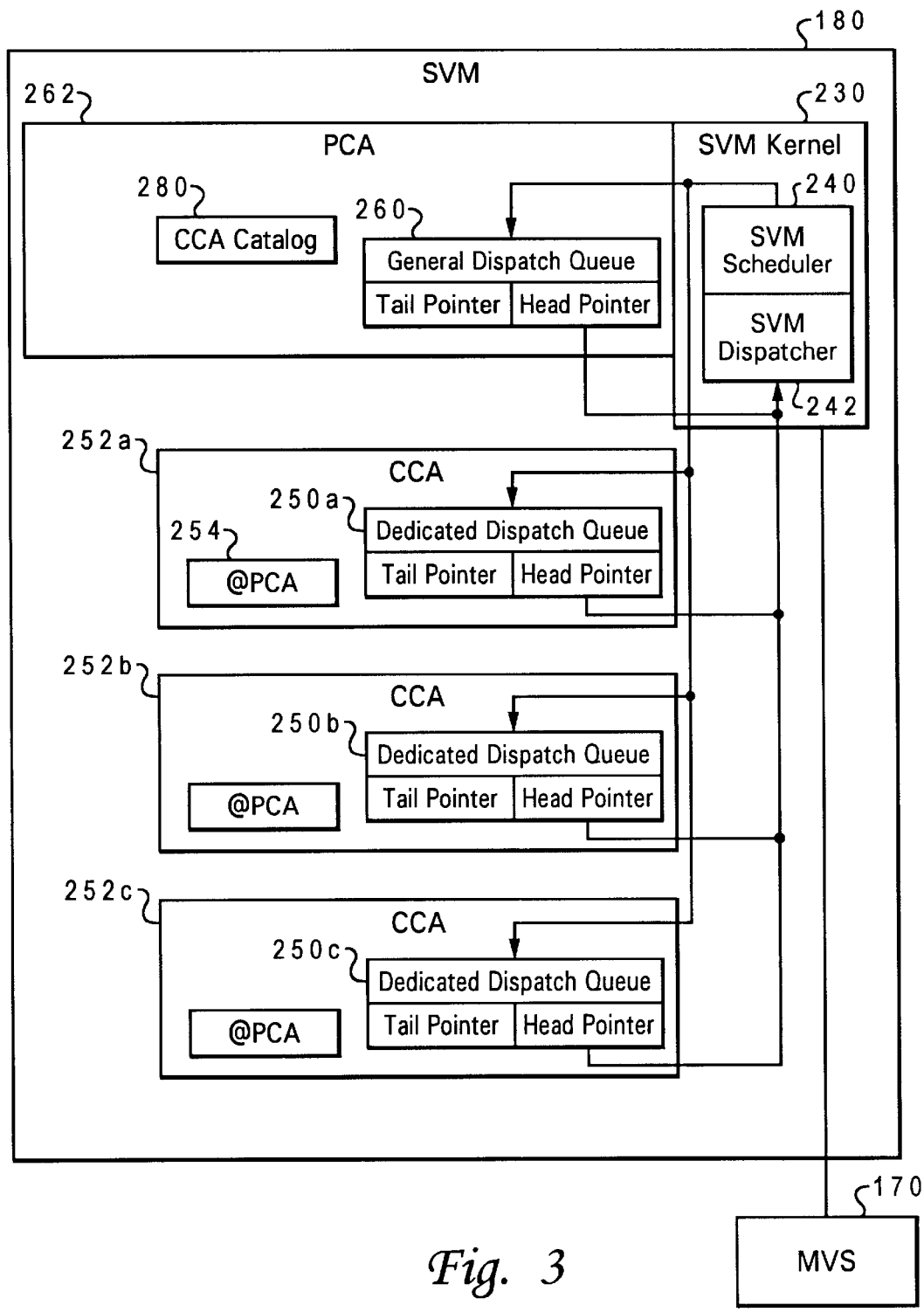
FIG. 3 is a block diagram depicting exemplary logical components of the present invention within the data processing system of FIG. 1, focusing on the application level.

With reference now to FIG. 3, there is illustrated a block diagram illustrating exemplary logical components of the present invention within data processing system 100, focusing on the application level. In particular, SVM 180, which operates at the application level, is shown as featuring an SVM kernel 230 that communicates with MVS 170. Included in SVM kernel 230 are an SVM scheduler 240 and an SVM dispatcher 242, which provide a layer of thread-management functionality to augment the TCB scheduling facilities provided by MVS 170. SVM 180 also includes a number of data structures which are utilized by SVM kernel 230 to manage threads at the application level. Those data structures are described in detail below, following a brief review of a typical conventional approach to application-level thread scheduling.

As explained above, a conventional application-level thread scheduler binds all threads to TCBs. In practice, the conventional application enforces the binding of threads to TCBs by establishing a separate dispatch queue for each TCB and dedicating each dispatch queue to a corresponding TCB, such that whenever any thread is dispatched from a dispatch queue, that thread is always dispatched to the same TCB (i.e., the TCB to which that dispatch queue is dedicated). For purposes of this document, when a dispatch queue is dedicated to a corresponding TCB in this manner, that dispatch queue is known as a dedicated dispatch queue. As explained above, a disadvantage associated with scheduling all threads on dedicated dispatch queues is that the queues may run out of threads frequently, with the result that the system may frequently incur the additional overhead introduced by operations such as WAIT and POST.

For example, if a conventional application that is using three dedicated dispatch queues has six threads ready to run, two threads might be scheduled on each dispatch queue. However, the two threads on one of the queues might be dispatched and complete execution before any new threads are added to that dispatch queue. When that happens, the conventional application relinquishes the TCB associated with the now-empty dispatch queue to the OS by issuing a WAIT command.

Like conventional applications, an application according to the present invention provides at least one dedicated dispatch queue. As depicted in FIG. 3, three dedicated dispatch queues 250a, 250b, and 250c are provided in the illustrative embodiment. Further, in the illustrative embodiment, as in conventional applications, all dedicated dispatch queues are based in an area of storage that is allocated to hold data to be used in managing a particular TCB. For purposes of this document, such storage areas are known as CPU communications areas (CCAs). One CCA is allocated for each TCB to be used by an application. In the illustrative embodiment, SVM 180 has allocated three CCAs 252a, 252b, and 252c, and each dedicated dispatch queue is based in (or resides in) one of the CCAS. That is, CCA 252a (for example) physically includes dedicated dispatch queue 250a, or CCA 252a contains data (such as a pointer) that can easily be used to locate dedicated dispatch queue 250a.

However, unlike conventional applications, an application according to the present invention does not bind all threads to TCBs. Instead, threads which require binding are distinguished from threads which do not require binding, the former are scheduled on dedicated dispatch queues, and the latter are scheduled on a general dispatch queue 260. This reduces the number of dispatch queues required to keep an application's TCBs busy, and, accordingly, reduces the risk of emptying a dispatch queue and thereby incurring the overhead described above. According to the present invention, general dispatch queue 260 is not based in a CCA but in the application's main storage area (i.e., the memory area used by the program to store data for managing the overall application). For purposes of this document, an application's main storage area is known as a program communications area (PCA). In the illustrative embodiment, when a thread is to be scheduled on general dispatch queue 260, SVM Scheduler 240 locates general dispatch queue 260 by reference to a PCA address field 254, which resides within the CCA for the TCB that was most recently used to execute that thread.

In both conventional applications and applications according to the present invention, each application has one and only one PCA, as well as at least one CCA (since, as explained above, the CCAs and TCBs have a one-to-one correspondence). Accordingly, FIG. 3 shows that SVM 180 includes one PCA 262, and general dispatch queue 260 is based in PCA 262. In addition, as mentioned above, in the illustrative embodiment SVM 180 utilizes three TCBs, and SVM 180 thus also includes CCAs 252a, 252b, and 252c.

Figure 4:
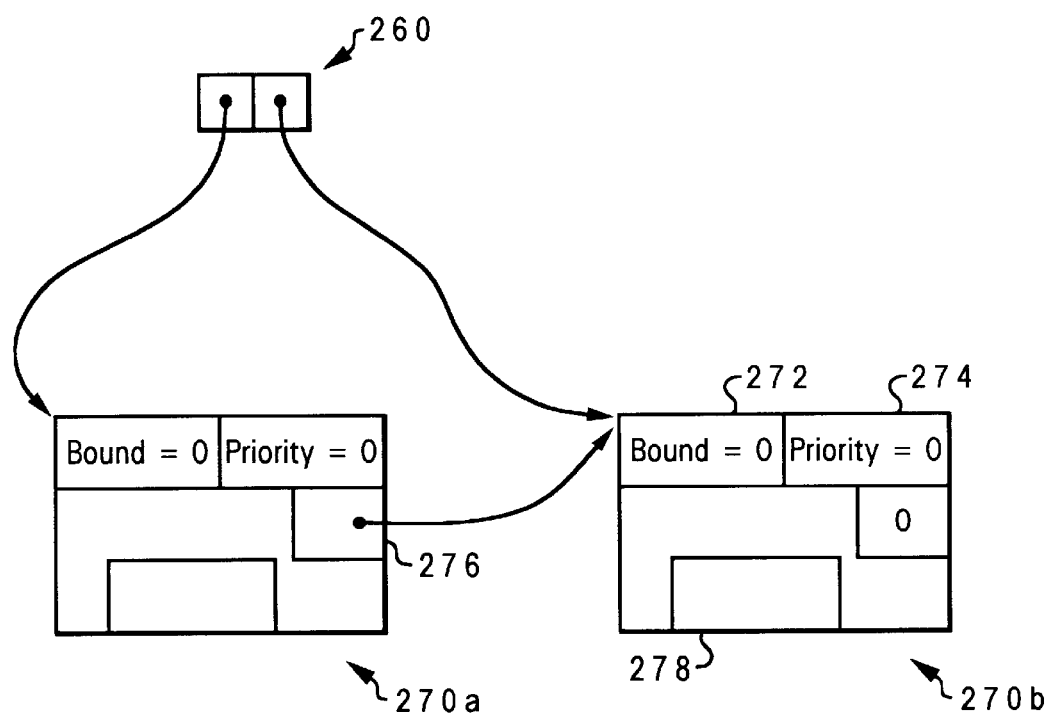
FIG. 4 is a block diagram illustrating an exemplary application-level dispatch queue according to the present invention.

In the illustrative embodiment, each thread is represented be a control block known as a dynamic storage area (DSA), and the dispatch queues are implemented as linked lists of DSAs. Within a CCA or PCA, a dispatch queue is represented by a head pointer, which points to the DSA at the head of the queue, and a tail pointer, which points to the DSA at the tail of the queue. For example, FIG. 4 illustrates general dispatch queue 260 containing two DSAs 270a and 270b. In addition to state data for the thread, each DSA includes a bound flag 272, a priority flag 274, and a next pointer 276. As indicated by the arrow leading from DSA 270a to DSA 270b, next pointer 276 points to the next DSA in the dispatch queue. However, if a DSA is at the tail of the queue, next pointer 276 is set to zero.

As described in greater detail below, each thread uses its bound flag 272 to indicate whether that thread can run on any TCB or should only be run on the current TCB. Priority flag 274 is used to specify dispatch priority within a particular queue. In the illustrative embodiment, when a TCB's priority flag has a low value, the scheduler adds the TCB to the tail of the queue, but when the priority flag has a high value, the TCB is added to the head of the queue. In the illustrative embodiment, SVM dispatcher 242 always dispatches from the head of the queue.

Part of the state data maintained in each DSA is an identifier of the CCA for the TCB that was most recently used to execute that DSA's thread. In the illustrative embodiment, threads running in a TCB maintain the address of that TCB's CCA in a predetermined storage area (specifically, in register 12), and the CCA identifier within a DSA is known as the CCA address field 278. Accordingly, when a thread in the illustrative embodiment relinquishes control of its TCB to SVM dispatcher 242, the address of the CCA for the TCB being relinquished (i.e., the content of register 12) is saved in the CCA address field of the DSA for that thread (e.g., CCA address field 278 within DSA 270b).

With reference again to FIG. 3, SVM kernel 230 keeps track of which CCA's are associated with SVM 180 by means of a CCA catalog 280, which resides in PCA 262. CCA catalog 280 identifies each of the CCAs being used by SVM 180, and indicates which of the corresponding TCBs are worker TCBs and which are non-worker TCBs. For purposes of this document, a worker TCB is a TCB that is created by an application for the purpose of executing threads from a corresponding dedicated dispatch queue and from the general dispatch queue; whereas a non-worker TCB is a TCB that is created by an application for the purpose of executing threads only from a corresponding dedicated dispatch queue.

Referring again to FIG. 2, in the illustrative embodiment, SVM application 180 creates two worker TCBs 110a and 110b and one non-worker TCB 110c during the application's initialization process. Further, SVM application 180 may add and remove worker and non-worker TCBs dynamically during the application's ongoing operations. Preferably, worker TCBs are added and removed as necessary to optimize the application's efficiency or to limit an application's consumption of the computer's processing power. For example, to optimize efficiency, the application would keep the number of worker TCBs as high as possible without causing the general dispatch queue to be exhausted frequently. To limit an application's impact on the computer (and thereby leave additional resources available for other applications), a lesser number of TCBs would be used.

Figure 5:
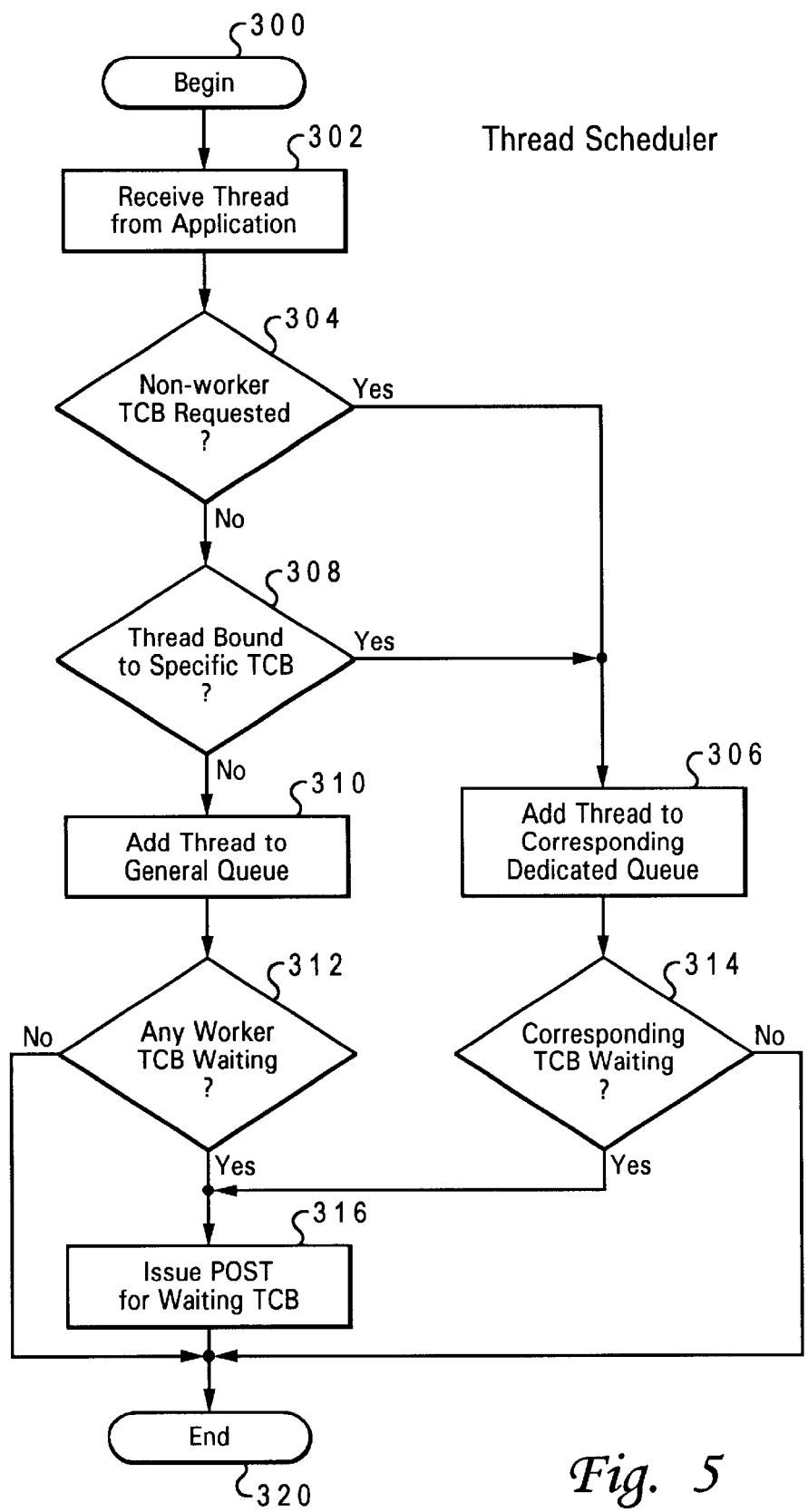
FIG. 5 is a high-level logical flowchart depicting an exemplary embodiment of a method for scheduling threads at the application level, according to the present invention.

With reference now to FIG. 5, there is illustrated a flowchart of an exemplary process, in accordance with the present invention, for scheduling threads at the application level of a multiprocessing system. That process is described in the context of data processing system 100 and begins at block 300 with MVS 170 and SVM 180 having been initialized and with worker TCBs 110a and 110b and non-worker TCB 110c (and the corresponding CCAs 252a, 252b, and 252c, respectively) having been created by SVM 180. The process then passes to block 302, which shows SVM scheduler 240 receiving a thread from SVM 180. For example, the thread may have been created by SVM kernel 230, the thread may been passed to SVM kernel 230 by TSM 182, or the thread may have been aroused from a suspended state by interrupt processing.

As depicted at block 304, it is then determined whether SVM 180 has requested a non-worker TCB for the thread. If so, the process passes to block 306, which illustrates SVM scheduler 240 adding the thread to the dedicated dispatch queue that corresponds to a non-worker TCB. That is, in the illustrative embodiment, the DSA for the thread is added to dedicated dispatch queue 250c. Non-worker TCBs are typically only requested for threads that include instructions which perform blocking operations.

Blocking operations are operations, such as calls to certain system services, that require synchronous responses from other system components, such as I/O subsystem hardware. When a blocking call is made, the application loses control of the TCB until the response is received. By contrast, OSs such as MVS 170 typically also support other system services (such as calls to software-level I/O subsystems) as non-blocking calls. For non-blocking calls, although the thread must still be suspended until a response is received, the application need not relinquish control of that thread's TCB, but may instead dispatch a new thread to that TCB. Since the application can use the TCB for other purposes (e.g., to process other threads), non-blocking calls are considered asynchronous.

Returning now to block 304, if SVM scheduler 240 determines that a non-worker TCB was not requested, it is then determined whether or not the thread is bound, as shown at block 308. In the illustrative embodiment, that means determining whether the bound flag is set in the thread's DSA (see, e.g., FIG. 4, DSA 270b and bound flag 272). In the illustrative embodiment, all threads are not bound when first created and can only become bound after the thread has been scheduled, dispatched, and executed, thereby giving the thread the opportunity to mark itself (if appropriate) as being bound. For example, a thread may mark itself as bound if that thread includes instructions for performing an asynchronous call which requires the response to be handled on the same TCB that was used to make the call. Alternatively, a series of threads can be bound to a particular TCB to enforce serial (as opposed to concurrent) execution of those threads.

If the thread is bound to a TCB, SVM scheduler 240 utilizes the value in the CCA address field 278 in that thread's DSA to locate the dedicated dispatch queue for the TCB that the thread last ran in, and SVM scheduler 240 then adds the DSA for the thread to that queue, as shown at block 306. If the thread is not bound to a DSA, however, SVM scheduler 240 adds the DSA for the thread to general dispatch queue 260, as depicted at block 310.

SVM scheduler 240 then determines whether any worker TCBs are in a WAIT state or whether the specific TCB associated with a dedicated dispatch queue is in a WAIT state, depending upon whether the DSA was added to general dispatch queue 260 or a dedicated dispatch queue, as shown at block 312 and 314. If the DSA went to general dispatch queue 260 and any worker TCBs are waiting (i.e., are in a state of suspension due to an earlier WAIT command), SVM scheduler 240 issues a post for one of those TCBs. Likewise, if the DSA went to a dedicated dispatch queue and the TCB for that queue is waiting, SVM scheduler 240 issues a POST for that TCB. Issuance of the POST is depicted at block 316. However, if that TCB or those TCBs are not waiting, the process of scheduling that thread ends, as indicated at block 320, to be started anew at block 302 upon receipt of a new thread to be scheduled.

In this manner, threads are added to general dispatch queue 260, to the dedicated dispatch queues associated with worker TCBs 210a and 210b (i.e., dedicated dispatch queues 250a and 250b), and to the dedicated dispatch queue associated with non-worker TCB 210c (i.e., dedicated dispatch queue 250c).

Figure 6:
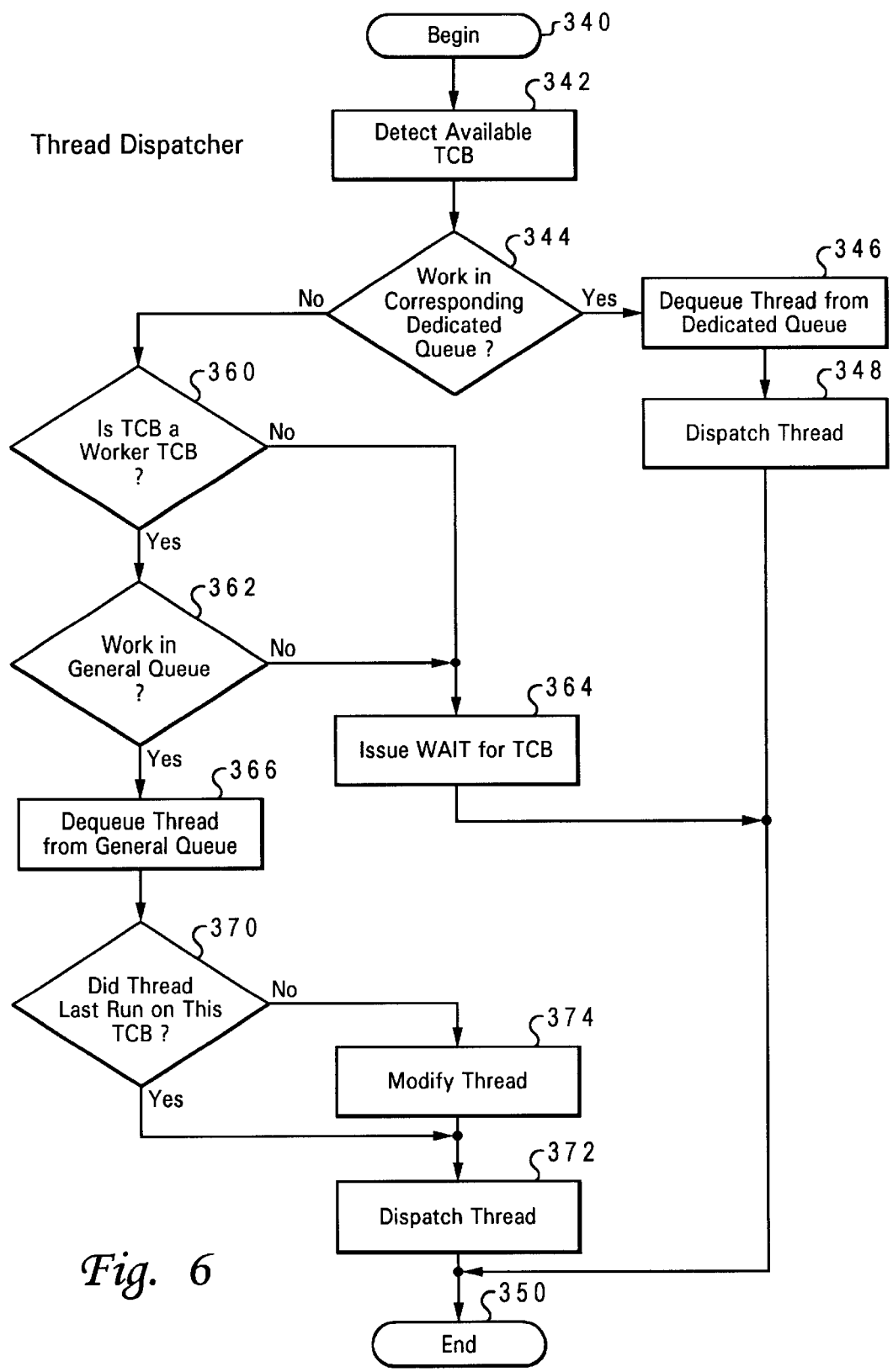
FIG. 6 is a high-level logical flowchart depicting an exemplary embodiment of a method for dispatching threads at the application level, according to the present invention.

Referring now to FIG. 6, there is depicted a flowchart of an exemplary process, in accordance with the present invention, for dispatching threads at the application level of a multiprocessing system. That process begins at block 340 with SVM 180 executing on data processing system 100. The process then passes to block 342, which shows SVM kernel 230 detecting that a TCB is ready to receive work. Typically, SVM kernel 230 detects that a TCB is available in response to the termination or suspension of a thread that SVM dispatcher 242 dispatched earlier. Alternatively, SVM kernel 230 may receive a TCB from MVS 170 as a result of SVM scheduler 240 issuing a POST command to MVS 170 (see FIG. 5, block 316).

As depicted at block 344, after an available TCB is detected, SVM 180 determines whether the dedicated dispatch queue corresponding to that TCB contains any work (i.e., any DSAs). In the illustrative embodiment, SVM 180 utilizes CCA catalog 280 to find that dedicated dispatch queue. If there is work in that dedicated dispatch queue, SVM dispatcher 242 dequeues the DSA at the head of that queue (as described in greater detail below) and dispatches the thread represented by that DSA to the TCB for execution, as illustrated at block 346 and 348; and the process then ends, as shown at block 350.

For example, if non-worker TCB 210c is received and there is work on the corresponding dispatch queue (i.e., dedicated dispatch queue 250c), the thread at the head of that queue is dispatched to TCB 210c. Similarly, if worker TCB 210a is received, the thread (if any) at the head of dedicated dispatch queue 250a is dispatched.

However, referring again to block 344, if it is determined that the corresponding dedicated dispatch queue is empty, SVM 180 then determines whether the received TCB is a worker or non-worker TCB, as shown at block 360. In the illustrative embodiment, this determination is made by reference to CCA catalog 280, which contains data that distinguishes CCAs for worker TCB from CCAs for non-worker TCBs. If the TCB is a worker TCB, SVM 180 determines whether general dispatch queue 260 contains any DSAs, as illustrated at block 362. As depicted at block 364, if general dispatch queue 260 is empty, or if it was determined at block 360 that the TCB is non-worker TCB, SVM 180 issues a WAIT to MVS 170 for that TCB; and the process then ends as shown at block 350.

However, if the TCB is a worker TCB and general dispatch queue 260 is not empty, the process passes from block 362 to block 366, which illustrates SVM dispatcher 242 dequeuing the DSA from the head of general dispatch queue 260. As illustrated at block 370, SVM 180 then determines whether the received TCB is the TCB that was last used to run the thread which that DSA represents. If it is, the thread is simply dispatched to the received TCB, as shown at block 372. If the thread is about to be dispatched to a new TCB, however, before the dispatch is performed, SVM 180 first modifies the thread, as depicted at block 374 (and described below). After the thread has been dispatched, the process ends, as shown at block 350, to resume at block 342 upon receipt of the next available TCB.

With further regard to the DSA modification of block 374, SVM 180 modifies the call frames that are stacked in the DSA save area so that those call frames (specifically, CCA address field 278) do not reference the CCA of the former TCB but instead reference the CCA of the new TCB. By modifying the DSA save areas in this manner, the present invention makes it possible to schedule, on the general dispatch queue, threads that would otherwise need to be bound to a particular TCB. For example, threads from programs written in the C programming language require binding in conventional thread-scheduling system, but such threads need not be bound and thus may be scheduled on the general dispatch queue according to the present invention.

Also, with further reference to blocks 346 and 366, the dequeuing operations according to the present invention must ensure that the dispatch queues, particularly the general dispatch queue, are not subject to adulteration from race conditions and the like, given the multiprocessing environment at issue. In the illustrative embodiment, a compare double store (CDS) instruction is utilized to dequeue DSAs, thus ensuring proper dequeuing operations. That is, the data in the queue is first read and then that data is used in executing the CDS instruction. The CDS instruction both (1) verifies that a given value is stored in a given location and (2) if the verification is successful, replaces the verified value with a given new value, as an atomic instruction. That is, once a CPU begins executing a CDS instruction, the CPU will not allow any other instruction to interrupt the CDS instruction. For example, referring again to FIG. 4, to dequeue DSA 270a, SVM dispatcher 242 reads the head and tail values of general dispatch queue 260 and determines which DSA is next after DSA 270a (here, DSA 270b). Then, SVM dispatcher 242 uses a CDS instruction to verify that the head and tail values of dedicated dispatch queue 260 have not changed and to replace the head value with a new head value identifying the next DSA in the queue (here, DSA 270b).

The dispatching process thus dispatches threads to worker TCBs and non-worker TCB and, when dispatching to worker TCBs, gives threads in dedicated dispatch queues priority over threads in the general dispatch queue. Each non-worker TCB only takes work from a corresponding dedicated dispatch queue, and all of the worker TCBs take work from a respective dedicated dispatch queue as well as from the general dispatch queue.

Furthermore, in accordance with the present invention, an application may dynamically add and subtract worker and non-worker TCBs. This flexibility makes it possible to avoid excessive POST and WAIT operations by reducing the number of worker TCBs if the general dispatch queue is emptied too frequently. This ability to alter the number if TCBs in use by an application also allows the application to limit and dynamically alter the amount of processing resources that application consumes, for example to accommodate the requirements of other concurrent applications.

Although the present invention has been described with reference to an exemplary embodiment, this description is not meant to be construed in a limiting sense. Various modifications of the disclosed embodiment, as well as alternative embodiments of the present invention, will become apparent to persons skilled in the art upon reference to the description of the present invention.

For instance, although the data structures and functional components of the exemplary embodiment have been described as residing in particular relative locations with the SVM application, those of ordinary skill in the art will appreciate that those data structures could relocated within the application and/or the functions redistributed among those functional components to a certain extent with departing from the present invention. Indeed, those of ordinary skill will understand that the present invention is not limited to the SVM application, but could be utilized to advantage in a wide variety of applications.

Also, the exemplary server cluster has been described in terms of a particular hardware and software architecture; however, that architecture should not be construed in a limiting sense. For example, the types of data processing systems with which the present invention could be utilized include, without limitation, multiprocessor systems, minicomputers, and mainframe computers. It should further be appreciated that, although the components of the SVM application are implemented as software in the illustrative embodiment, some of those components or portions thereof, could be implemented as software, hardware, firmware, or a combination of these.

In addition, although aspects of the present invention have been described with respect to a computer system executing software that directs the functions of the present invention, it should be understood that the present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

It is therefore contemplated that various modifications, including, without limitation, those described above, can be made without departing from the spirit or scope of the present invention as defined in the appended claims.

What is claimed is:

1. A method for utilizing dispatch queues in a data processing system with multiple processors, an operating system, and an application with multiple threads, said method comprising:

creating a dedicated dispatch queue at an application level and a general dispatch queue at said application level, wherein said dedicated dispatch queue is dedicated to a task control block (TCB) of said data processing system;

in response to determining that said TCB is available and said dedicated dispatch queue is not empty, dispatching a thread from said dedicated dispatch queue to said available TCB for execution; and in response to determining that said TCB is available and said dedicated dispatch queue is empty, dispatching a thread from said general dispatch queue to said available TCB for execution.

2. The method of claim 1, wherein:

said method further comprises distinguishing bound threads from unbound threads among said multiple threads of said application;

scheduling said bound threads only on said dedicated dispatch queue; and scheduling said unbound threads only on said general dispatch queue.

3. The method of claim 1, wherein:

said method further comprises utilizing thread attributes to specify, at said application level, which of said multiple threads are bound threads.

4. The method of claim 1, wherein:

said step of creating a dedicated dispatch queue comprises creating first and second dedicated dispatch queues at said application level, wherein said first and second dedicated dispatch queues are respectively dedicated to a non-worker TCB of said data processing system and a worker TCB of said data processing system; and said step of dispatching a thread from said general dispatch queue to said available TCB is performed only if said available TCB is said worker TCB.

5. The method of claim 4, wherein said method further comprises:

scheduling a thread on said first dedicated dispatch queue in response to an indication from said application that said thread requires a non-worker TCB.

6. The method of claim 1, wherein said method further comprises:

determining that said thread from said general dispatch queue last executed on a previous TCB that differs from said available TCB; and before dispatching said thread, modifying state data for said thread to support execution of said thread on said available TCB in lieu if said previous TCB.

7. A data processing system with multiple processors and an operating system, said data processing system comprising:

an application;

multiple threads within said application;

a general dispatch queue within said application;

a task control block (TCB);

a dedicated dispatch queue within said application, wherein said dedicated dispatch queue is dedicated to said TCB; and a dispatcher within said application, wherein:

in response to determining that said TCB is available and said dedicated dispatch queue is not empty, said dispatcher dispatches a thread from said dedicated dispatch queue to said available TCB for execution; and in response to determining that said TCB is available and said dedicated dispatch queue is empty, said dispatcher dispatches a thread from said general dispatch queue to said available TCB for execution.

8. The data processing system of claim 7, wherein:

said application distinguishing bound threads from unbound threads among said multiple threads; and said application includes a scheduler that schedules said bound threads only on said dedicated dispatch queue and that schedules said unbound threads only on said general dispatch queue.

9. The data processing system of claim 7, wherein:

said application includes dynamic storage areas (DSAs) that represent said multiple threads;

said DSAs include thread attributes; and said application modifies said thread attributes to specify which of said multiple threads are bound threads.

10. The data processing system of claim 7, wherein:

said application comprises first and second dedicated dispatch queues, wherein said first and second dedicated dispatch queues are respectively dedicated to a non-worker TCB of said data processing system and a worker TCB of said data processing system; and said dispatcher dispatches a thread from said general dispatch queue to said available TCB only if said available TCB is said worker TCB.

11. The data processing system of claim 10, wherein:

said application includes a scheduler that schedules a thread on said first dedicated dispatch queue in response to an indication from said application that said thread requires a non-worker TCB.

12. The data processing system of claim 7, wherein:

in response to a determination that said thread from said general dispatch queue last executed on a previous TCB that differs from said available TCB, said application modifies state data for said thread to support execution of said thread on said available TCB in lieu of said previous TCB before said dispatcher dispatches said thread.

13. A program product that provides dispatch queues for an application with multiple threads in a data processing system with multiple processors and an operating system, said program product comprising:
- a computer-usable medium encoding instructions which, when executed on said data processing system, perform the steps of:
- creating a dedicated dispatch queue at an application level and a general dispatch queue at said application level, wherein said dedicated dispatch queue is dedicated to a task control block (TCB) of said data processing system;
- in response to determining that said TCB is available and said dedicated dispatch queue is not empty, dispatching a thread from said dedicated dispatch queue to said available TCB for execution; and
- in response to determining that said TCB is available and said dedicated dispatch queue is empty, dispatching a thread from said general dispatch queue to said available TCB for execution; and 14. The program product of claim 13, wherein said computer-usable medium further encodes instructions which, when executed on said data processing system, perform the steps of:
- distinguish bound threads from unbound threads among said multiple threads of said application;
- schedule said bound threads only on said dedicated dispatch queue; and
- schedule said unbound threads only on said general dispatch queue.

15. The program product of claim 13, wherein said computer-usable medium further encodes instructions which, when executed on said data processing system, perform the step of:
utilizing thread attributes to specify, at said application level, which of said multiple threads are bound threads.

16. The program product of claim 13, wherein:
- said instructions for creating a dedicated dispatch queue comprise instructions for creating first and second dedicated dispatch queues at said application level, wherein said first and second dedicated dispatch queues are respectively dedicated to a non-worker TCB of said data processing system and a worker TCB of said data processing system; and
- said instructions dispatch a thread from said general dispatch queue to said available TCB only if said available TCB is said worker TCB.

17. The program product of claim 16, wherein said computer-usable medium further encodes instructions which, when executed on said data processing system, perform the step of:
scheduling a thread on said first dedicated dispatch queue in response to an indication from said application that said thread requires a non-worker TCB.

18. The program product of claim 13, wherein said computer-usable medium further encodes instructions which, when executed on said data processing system, perform the steps of:
- determining that said thread from said general dispatch queue last executed on a previous TCB that differs from said available TCB; and
- before dispatching said thread, modifying state data for said thread to support execution of said thread on said available TCB in lieu of said previous TCB.

* * * * *